United States Patent
Khan et al.

(10) Patent No.: US 11,451,443 B2
(45) Date of Patent: Sep. 20, 2022

(54) COMMUNICATIONS NETWORK PERFORMANCE

(71) Applicant: British Telecommunications Public Limited Company, London (GB)

(72) Inventors: Kashaf Khan, London (GB); Newland Andrews, London (GB)

(73) Assignee: British Telecommunications Public Limited Company, London (GB)

( * ) Notice: Subject to any disclaimer, the term of this patent is extended or adjusted under 35 U.S.C. 154(b) by 236 days.

(21) Appl. No.: 16/494,227

(22) PCT Filed: Mar. 13, 2018

(86) PCT No.: PCT/EP2018/056294
§ 371 (c)(1),
(2) Date: Sep. 13, 2019

(87) PCT Pub. No.: WO2018/167092
PCT Pub. Date: Sep. 20, 2018

(65) Prior Publication Data
US 2020/0092167 A1 Mar. 19, 2020

(30) Foreign Application Priority Data
Mar. 14, 2017 (EP) .................................... 17160873

(51) Int. Cl.
*H04L 41/0823* (2022.01)
*H04L 41/16* (2022.01)
*H04L 43/062* (2022.01)

(52) U.S. Cl.
CPC .......... *H04L 41/0823* (2013.01); *H04L 41/16* (2013.01); *H04L 43/062* (2013.01)

(58) Field of Classification Search
CPC .... H04L 43/062; H04L 41/0823; H04L 41/16
(Continued)

(56) References Cited

U.S. PATENT DOCUMENTS 8,018,866 B1   9/2011 Kasturi et al.
2008/0144527 A1   6/2008 Marcondes et al.
(Continued)

FOREIGN PATENT DOCUMENTS

EP   2604005 A1   6/2013
EP   2767071 A1   8/2014
(Continued)

OTHER PUBLICATIONS

Combined Search and Examination Report under Sections 17 and 18(3) For GB Application No. 1704053.6, dated Aug. 10, 2017, 8 pages.

(Continued)

*Primary Examiner* — Wing F Chan
*Assistant Examiner* — Leon Y Tseng
(74) *Attorney, Agent, or Firm* — Patterson Thuente IP (57) ABSTRACT

A method of improving performance of network communication for an application communicating via a wide area network (WAN) including executing a classifier including a machine learning algorithm to classify a data set corresponding to a profile of network communication via the WAN for the application, the classification identifying the network communication as a candidate for WAN optimization, wherein the classifier is trained based on a plurality of training data sets each having associated an indication of suitability for WAN optimization; and responsive to the identification of the network communication as a candidate for WAN optimization implementing WAN optimization for the application.

13 Claims, 3 Drawing Sheets

(58) Field of Classification Search
USPC .......................................................... 709/224
See application file for complete search history.

(56) References Cited

U.S. PATENT DOCUMENTS

| | | |
|---|---|---|
| 2010/0085975 A1 | 4/2010 | Wang |
| 2015/0039744 A1 | 2/2015 | Niazi |
| 2015/0043335 A1 | 2/2015 | Testicioglu et al. |
| 2015/0199207 A1 | 7/2015 | Lin |
| 2016/0094418 A1* | 3/2016 | Raney .................. H04L 43/028 370/241 |
| 2016/0275412 A1 | 9/2016 | Lu |
| 2016/0306675 A1 | 10/2016 | Wiggers |

FOREIGN PATENT DOCUMENTS

| | | |
|---|---|---|
| EP | 2789185 A1 | 10/2014 |
| WO | WO2018/167093 | 9/2018 |

OTHER PUBLICATIONS

Extended European search report For EP Application No. 17160873.0, dated Jun. 7, 2017, 7 pages.
Application and Filing Receipt for U.S. Appl. No. 16/494,201, filed Sep. 13, 2019, Inventor Khan.
International Search Report and Written Opinion, Application No. PCT/EP2018/056294, dated Apr. 24, 2018, 10 pages.
International Preliminary Report on Patentability, Application No. PCT/EP2018/056294, dated Sep. 17, 2019, 8 pages.
Altman, N.S., *An Introduction to Kernel and Nearest Neighbor Nonparametric Regression*, Cornell University, 32 pages, Jun. 1991.
Li, Wenchao, *A New Intrusion Detection System Based on KNN Classification Algorithm in Wireless Sensor Network* , Hindawi Publishing Corporation, Journal of Electrical and Computer Engineering, vol. 2014, Article ID 240217, 8 pages.
Liu, Huan, *Feature Selection: For Knowledge Discovery and Data Mining*, Springer Science + Business Media, LLC, 225 pages, © 1998.
Salton, G., *A Vector Space Model for Automatic Indexing*, Cornell University, Nov. 1975, vol. 18, Nov. 11, 8 pages.
International Search Report and Written Opinion, Application No. PCT/EP2018/056295, dated Apr. 6, 2018, 10 pages.
International Preliminary Report on Patentability, Application No. PCT/EP2018/056295, dated Sep. 17, 2019, 7 pages.
Chiang, Ron, *Matrix: Achieving Predictable Virtual Machine Performance in the Clouds Matrix: Achieving Predictable Machine Performance in the Clouds*, Proceedings of the 11$^{th}$ International Conference on Automatic Computing, Jun. 18-20, 2014, pp. 45-56.
Farahnakian, Fahimeh, *Energy Aware Consolidation Algorithm Based on K-Nearest Neighbor Regression for Cloud Data Centers*, 2013, IEEE, pp. 256-259.
Zhang, Jian, *Adaptive Predictor Integration for System Performance Prediction*, 2014, IEEE, pp. 1-10.

* cited by examiner

COMMUNICATIONS NETWORK PERFORMANCE

CROSS-REFERENCE TO RELATED APPLICATIONS

The present application is a National Phase entry of PCT Application No. PCT/EP2018/056294, filed Mar. 13, 2018, which claims priority from European Patent Application No. 17160873.0 filed Mar. 14, 2017, each of which is fully incorporated herein by reference.

TECHNICAL FIELD

The present disclosure relates to improving the performance of a communications network and in particular a wide area network (WAN).

BACKGROUND

As computer systems are transitioned to cloud computing environments the communication between network connected elements of the system can become more distant from each such as due to a geographic distance and/or a logical distance arising due an intermediate network connection between the elements such as multiple networks or types of network. For example, client/server computer systems including one or more client components such as software applications executing on physical or virtual client machines can be located on different premises as one or more server components such as application, transaction and/or data servers executing on physical or virtual server machines. Such an arrangement may occur, for example, where a computer system is transitioned to, or developed for, a cloud computing service provider with a computing and/or data center for executing, for example, server application software within a cloud computing environment that is not collocated with computing environments in which client computing systems execute.

The networking between two computing environments required for a computing system connecting clients and servers that are distanced, e.g. geographically, is known as a wide area network (WAN) and employs one or more telecommunications technologies to provide the requisite communication therebetween. The computing system having communicating elements such as client and server elements and using infrastructure, platform and software products and/or services can be affected by significant distance between communicating elements as throughput, reliability, speed etc. may suffer where the application is deployed across a WAN (vis-à-vis a local area network (LAN), for example).

Improvements in network metrics including speed and throughput can be realized by increasing the network capacity, throughput and/or availability for a computing system with a corresponding increase in cost.

Alternatively, efficiency improvements can be made for the use of existing provisioned network resources, such as WAN optimization, which may or may not improve network performance. Thus in response to an identification of network performance challenges such as by user/operator observation or even probing of WAN performance then WAN optimization techniques may be attempted in an effort to improve network and, therefore, application performance. Thus such attempts are based on trial and error and depend on the particular nature of the application and its network communication.

WAN optimization measures can include: traffic shaping; data deduplication; compression; caching; non-essential traffic identification; usage rule enforcement; protocol acceleration and protocol spoofing. Such optimization measures can be implemented using physical or virtualized WAN acceleration devices that employ one or more such optimization methods.

The existing approach to deploying WAN optimization measures therefore involves trial and error based on an identification of communication performance challenges and manually triggered and configured WAN optimization mechanisms which can be probed and monitored for effectiveness and refined over time, or disregarded on the basis of ineffectiveness. Thus the effectiveness, appropriateness or otherwise of WAN optimization vis-à-vis alternative approaches (such as the provisioning of increased network resource) is understood only after deployment of WAN optimization measures.

SUMMARY

It would be beneficial to overcome these disadvantages in the state of the art to provide for the optimization of computing systems operating over a WAN where such optimization will be effective.

The present disclosure accordingly provides, in a first aspect, a method of improving performance of network communication for an application communicating via a wide area network (WAN) comprising: executing a classifier including a machine learning algorithm to classify a data set corresponding to a profile of network communication via the WAN for the application, the classification identifying the network communication as a candidate for WAN optimization, wherein the classifier is trained based on a plurality of training data sets each having associated an indication of suitability for WAN optimization; and responsive to the identification of the network communication as a candidate for WAN optimization implementing WAN optimization for the application.

In some embodiments, each training data set corresponds to a training profile of network communication via the WAN.

In some embodiments, each training profile is generated from previous network communication via the WAN for an application and the indication of suitability for WAN optimization associated with a training data set corresponding to the training profile is determined empirically based on deployment of WAN optimization for the application.

In some embodiments, WAN optimization includes one or more of: traffic shaping; data deduplication; compression; caching; non-essential traffic identification and reduction; usage rule enforcement; and protocol spoofing.

In some embodiments, the machine learning algorithm uses a k-nearest neighbors (k-NN) algorithm.

In some embodiments, the data set is an aggregation of data received from a plurality of parameter collectors.

In some embodiments, the parameter collectors include one or more of: NetFlow traffic analyzer; and a deep packet inspector.

In some embodiments, the data set is aggregated from the data received in a predetermined time window.

In some embodiments, implementing the WAN optimization includes deploying a WAN optimization device in association with each endpoint of communication across the WAN.

In some embodiments, the application is a cloud application including a client and a cloud server and the network communication via the WAN takes place between the client and server, and wherein each of the WAN optimization devices is a virtualized device.

In some embodiments, each WAN optimization device implements WAN optimization by implementing one or more network communication optimization techniques coordinated between the WAN optimization devices, wherein the network communication optimization techniques include: traffic shaping; data deduplication; compression; caching; non-essential traffic identification and reduction; usage rule enforcement; and protocol spoofing.

The present disclosure accordingly provides, in a second aspect, a computer system including a processor and memory storing computer program code for performing the method set out above.

The present disclosure accordingly provides, in a third aspect, a computer program element comprising computer program code to, when loaded into a computer system and executed thereon, cause the computer to perform the method set out above.

BRIEF DESCRIPTION OF THE DRAWINGS

Embodiments of the present disclosure will now be described, by way of example only, with reference to the accompanying drawings, in which.

DETAILED DESCRIPTION

Figure 1:
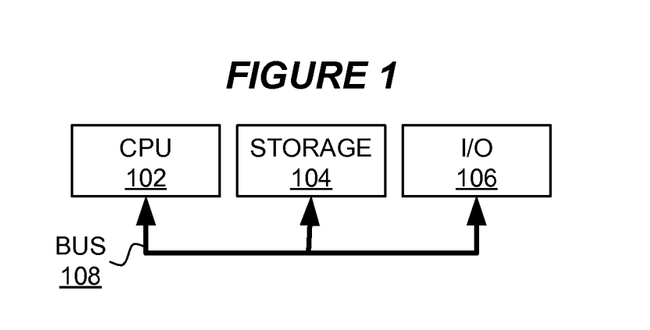
FIG. 1 is a block diagram of a computer system suitable for the operation of embodiments of the present disclosure.

FIG. 1 is a block diagram of a computer system suitable for the operation of embodiments of the present disclosure. A central processor unit (CPU) 102 is communicatively connected to a storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
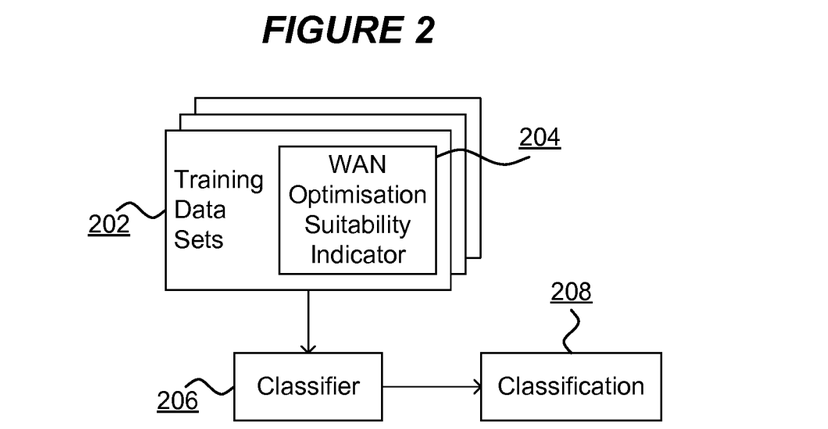
FIG. 2 is a component diagram of an arrangement for training a classifier based on training data sets in accordance with embodiments of the present disclosure.

FIG. 2 is a component diagram of an arrangement for training a classifier 206 based on training data sets 202 in accordance with embodiments of the present disclosure. The classifier is a hardware, software, firmware or combination component adapted to provide a classification 208 of data items using a machine learning algorithm. The classification 208 is constituted based on training examples such as vectors in a multidimensional feature space and each training example has associated a classification indication. Thus, during training, examples are stored or indicated in the feature space in association with an indication of their classification. A feature space is a vector space in which vectors associated with classifiable entities (such as network communication characteristics in accordance with embodiments of the present invention) can be represented, mapped or stored as is described in "*Feature Selection for Knowledge Discovery and Data Mining*" (Liu, H., Motoda, H., 1998, Kluwer Academic Publishers, Norwell, Mass., USA). In a preferred embodiment, a k-nearest neighbor (k-NN) algorithm is employed to provide the classification. The k-NN algorithm is described in the paper "*An Introduction to Kernel and Nearest-Neighbor Nonparametric Regression*" (Altman, The American Statistician, Vol. 46, No. 3., August 1992, pp. 175-185).

In accordance with embodiments of the present disclosure the classifier 206 generates the classification 208 based on a plurality of training data sets 202. Each training data set 202 is a vector such as a multi-dimensional vector derived from data relating to a software application communicating via a WAN and has associated an indication of suitability of WAN optimization 204 for the training data set. The vector can be derived from application, communication and/or network characteristics and/or attributes for an application communicating via the WAN. Such characteristics and/or attributes can include or be derived from one or more of, inter alia: network source and/or destination addresses such as internet protocol (IP) addresses; channel or port identifiers such as IP ports; channel or port counts employed and/or a number of data flows between a source and destination endpoint for the application; a volume of data communicated via the WAN; a class of service for a protocol of data communicated via the WAN; a level, degree, extent or rate of data loss in network communication such as a packet loss metric or the like; a classification, type or category of the application or an identifier of the application; a number of network communication sessions such as a number of transmission control protocol (TCP) sessions; a measure, metric or class of application delay in network communication; and/or a measure, metric or class of application jitter in network communication, such as a deviation from an expected or true periodicity of a periodic signal or communication.

The indication of suitability of WAN optimization 204 associated with a training data set 202 can be determined empirically based on the implementation of one or more WAN optimization mechanisms and an observation of any extent of positive effect on a performance of network communication via the WAN. Such performance can be measured, for example, by way of: data transfer speed; throughput; bandwidth; responsiveness; or other suitable measures as will be apparent to those skilled in the art. WAN optimization mechanisms can include one or more of, inter alia: traffic shaping; data deduplication; compression; caching; non-essential traffic identification and reduction or elimination; usage rule enforcement; protocol spoofing; and other mechanisms as will be apparent to those skilled in the art. WAN optimization can be implemented by provisioning one or more WAN optimization devices as hardware, software, firmware or combination components in association with any, either or each end or ends of a communication for an application via the WAN. In some embodiments, the WAN optimization device(s) are implemented as virtualized devices in one or more virtualized computing environments and accordingly can be provided dynamically and potentially remotely.

Notably, the WAN optimization suitability indication 204 for a training data set 202 preferably includes an identification of one or more WAN optimization measures or types of measure that are empirically determined to be suitable for an application associated with the training data set 202 in that the measures or types of measure provide an improvement in performance for the application. Thus, in this way, the classification 208 can identify suitability of WAN optimization and further suitability of one or more particular WAN optimization measures or types of measure.

Thus the training data sets 202 including WAN optimization suitability indicators 204 are used by the classifier 208 to generate the classification 208 across the feature space such that the classification 208 can be subsequently employed by the classifier 206 to classify characteristics of a new application communicating via a WAN to determine a classification for the new application. Such a determined classification informs a determination of the suitability of WAN optimization based and in some embodiments further informs a determination of the suitability of one or more particular WAN optimization measures or types of measure.

Figure 3:
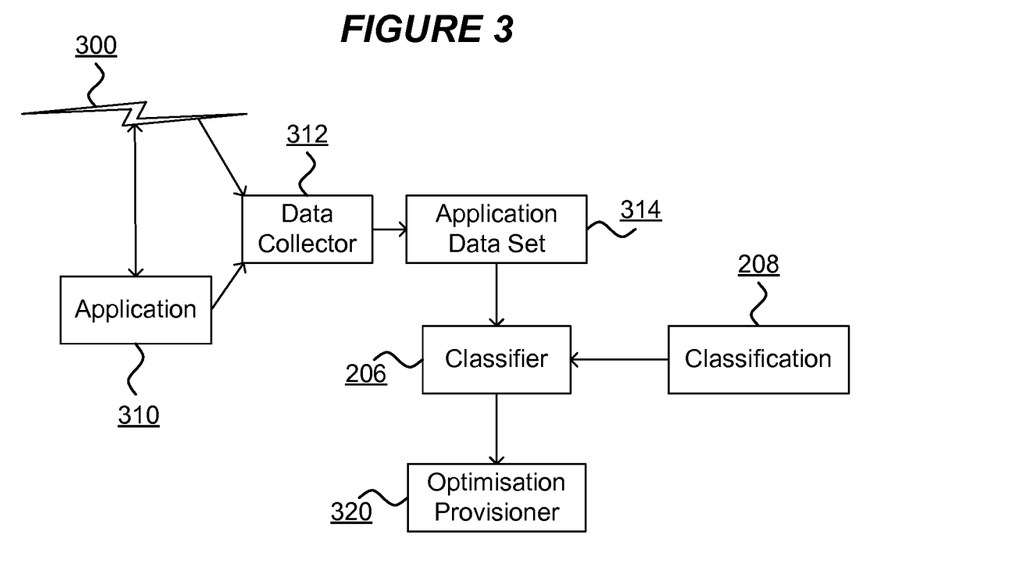
FIG. 3 is a component diagram of an arrangement for improving performance of network communication for an application communicating via a WAN in accordance with embodiments of the present disclosure.

FIG. 3 is a component diagram of an arrangement for improving performance of network communication for an application 310 communicating via a WAN 300 in accordance with embodiments of the present disclosure. The classification 208 in FIG. 3 is trained according to the techniques and arrangements described above with respect to FIG. 2 such that the classifier 206 of FIG. 3 (corresponding substantially to the classifier 206 of FIG. 2) determines the suitability of WAN optimization for a data set 314 for an application.

FIG. 3 includes a software application 310 which communicates via a WAN 300. For example, the application 310 is a cloud application having a server component deployed in or with a virtualized cloud computing environment and a client component for communication therewith via the WAN 300. One or more data collectors 312 are provided interfaced with, in communication with or accessing data for either or both the application 310 and the WAN 300. For example, a data collector 312 can access, retrieve, measure or determine data for either or all of one or more client components, intermediate components and/or server components of the application 310. Additionally or alternatively, the data collector 312 can access, retrieve, measure or determine data from or associated with network devices and/or appliances for the WAN 300 such as routers, switches, access points, gateways, hubs and the like. Additionally or alternatively, the data collector 312 can access, retrieve, measure or determine data from communication media, mechanisms or conduits for the WAN such as network cables, wireless signals and the like.

The one or more data collectors 312 are configured to generate an application data set 314 for the application communicating via the WAN. The application data set 314 is a vector such as a multi-dimensional vector derived from data relating to the application 310 communicating via the WAN 300. The application data set 314 is substantially the same as any of the training data sets 202 described above except that it is specifically associated with the application 310 and does not have associated a WAN optimization suitability indicator. Thus, the application data set 314 constitutes a basis for the classifier 206 to determine a classification for the application data set 314 and, therefore, the application 310, so as to determine a suitability of WAN optimization for the application 310 based on the learned classification 208. Further, where a classification of the application data set 314 corresponds to an indication of suitability of one or more particular WAN optimization measures or types of measure then such measures or types of measure can also be identified as suitable for implementation for the application 310. Yet further, where the classification of the application data set 314 does not indicate suitability of WAN optimization for the application 310 then an indication that WAN optimization will be ineffective can be generated for the application 310. An indication that WAN optimization will be ineffective is valuable as it can indicate a requirement for a reconfiguration of the application 310, a computing infrastructure with which the application 310 executes and/or the WAN 300 such as by provisioning additional or different resources for the application 310 such as additional network resource, additional computing resource or the like as will be apparent to those skilled in the art.

As described above in respect of a training phase of the classifier 206, the classifier 206 can use the k-NN algorithm, a similar or alternative suitable machine learning algorithm to classify the application data set 314. The k-NN algorithm is particularly suited to classification in accordance with embodiments of the present disclosure because the application data set 314 vector can be based on potentially numerous application, network and/or communication characteristics and may not be expected to identify, map to or be stored at identical locations in the machine learning feature space due to the potentially wide variation in characteristics which may differ across potentially many applications, computing infrastructures and/or computer network arrangements. Accordingly, algorithms such as the k-NN algorithm can provide for the classification based on one or more measures of proximity in the feature space, such as a Euclidean distance of vectors. While k-NN is described here, alternative algorithms are suitable including algorithms suitable for generating classifications where a cluster or collection of classified entries in a feature space can be identified and associated to constitute a classification, such as clusters based on known clustering methods and/or predetermined definitions of clustering parameters such as degrees of association and/or similarity to constitute and/or define a cluster.

FIG. 3 further includes an optimization provisioner 320 as a software, hardware, firmware or combination component configured to provision one or more WAN optimization strategies by implementing WAN optimization for the application 310. The optimization provisioner 320 is responsive to the classifier 206 such that where the classifier 206 identifies that the application 310 is suitable for WAN optimization based on the classification 208, and thus identifies that the network communication for the application 310 is a candidate for WAN optimization, the optimization provisioner 320 implements WAN optimization.

WAN optimization implemented by the optimization provisioner 320 can take a form as previously described. Further, where the classification 208 indicates a particular set of one or more WAN optimization strategies suitable for the application 310 the optimization provisioner 320 can implement some or all of the indicated optimization strategies. Thus, in one embodiment, the optimization provisioner 320 is configured to implement WAN optimization such as by deploying a WAN optimization device such as a hardware, software, firmware or combination device (which may be a virtualized device) at or in association with one or more endpoints of communication via the WAN by the application 310. In this way embodiments of the present disclosure identify the suitability of WAN optimization for the application 310 based on the learned classification without requiring the prospective installation of WAN optimization facilities and probing the effect thereof combined with manual interpretation of such effect to determine suitability on a case-by-case basis. Thus the need for trial-and-error in WAN optimization is avoided.

Figure 4:
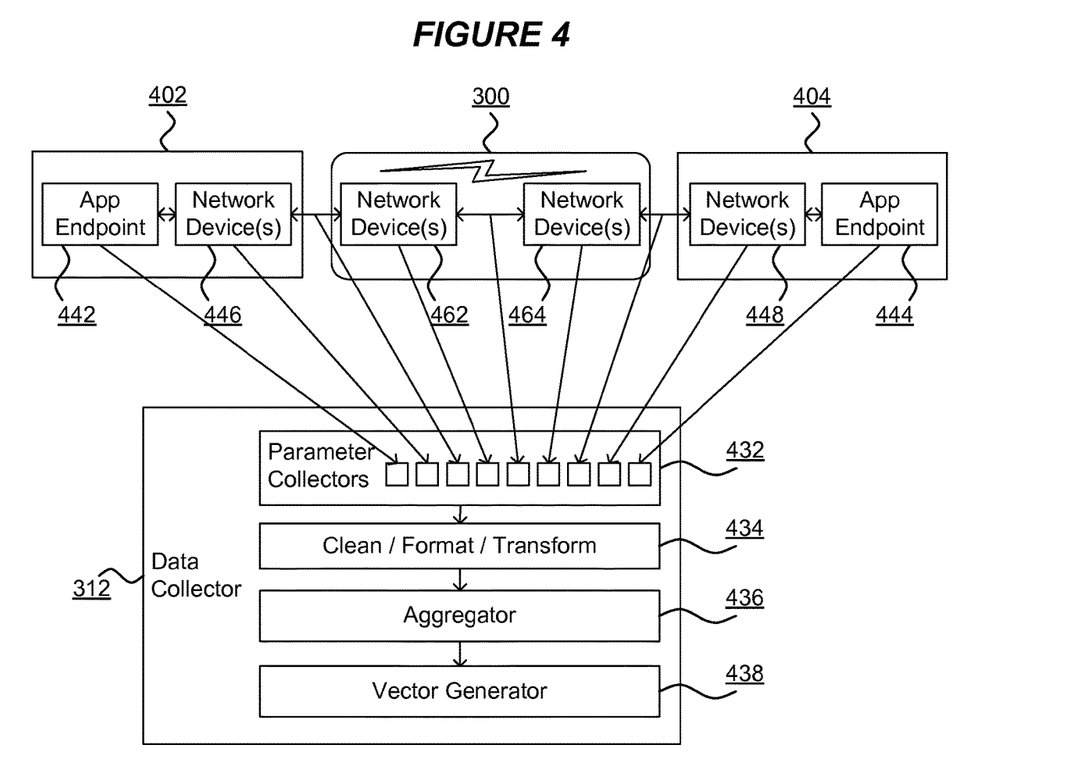
FIG. 4 illustrates an arrangement for the data collector of FIG. 3 in accordance with embodiments of the present disclosure.

FIG. 4 illustrates an arrangement for the data collector 312 of FIG. 3 in accordance with embodiments of the present disclosure. As previously described, the data collector 312 accesses, measures, determines or retrieves data for either or both the application 310 and the WAN 300. Furthermore, the data collector 312 can be employed to access, measure, determine or retrieve data for applications and/or networks for the generation of the training data sets 202. Thus the operation of the data collector 312 is substantially the same whether the data collected is for the generation or definition of training data sets 202 or the application data set 314, which will be referred to collectively as "data sets" herein.

Data for each of the data sets is transformed to a vector representation generated from data collected by the data collector 312. In one embodiment the data collector 312 obtains data from multiple sources as parameters and aggregates the parameters so as to generate a vector for a data set. Accordingly, in one embodiment, the data collector 312 includes one or more parameter collectors 432 as software, hardware, firmware or combination components for obtaining, receiving, determining and/or measuring parameter data. Each parameter collector 432 can be directed to the collection of data from a particular component or resource of an application or WAN 300 or can collect data from multiple such components or resources. For example, one or more parameter collectors 432 can be directed to collect data from one or more application endpoints 442, 444 of network communication for the application. Such data can include application data such as: application identification; information pertaining to the sending or receiving of data by an application endpoint for communication via the WAN 300; an application type; one or more communication ports such as TCP ports used for communication by the application endpoint; a TCP session count; a volume, frequency, period or rate of communication by the application endpoint; and other such attributes and/or characteristics in relation to application endpoints as will be familiar to those skilled in the art.

Further, one or more parameter collectors 432 can be directed to collect data from one or more network devices 446, 462, 464, 448 such as physical or virtual routers, edge routers, gateway routers, gateways, switches, ports, access points, terminals, connectors, network servers or the like. For example, parameter collectors 432 can be configured to receive, access or obtain network protocol traffic information such as NetFlow data including one or more of: ingress interface information; egress interface information; source addresses for network communication such as source IP addresses; destination addresses for network communication such as destination IP addresses; an identification of a protocol such as an IP protocol; source port, ports or port range for user datagram protocol (UDP) or TCP protocols; destination port, ports or port range for UDP or TCP protocols; bandwidth information and/or a bandwidth range; flow volume information and/or a flow volume range; network management information such as simple network management protocol (SNMP) information; a class of service; data, message or packet loss information; a type code for control protocols such as internet control message protocol (ICMP); a type of service (ToS) for IP communication such as may be obtainable from an IP header; application information for communication; a session count; and other network traffic information as will be apparent to those skilled in the art.

Further, one or more parameter collectors 432 can be directed to collect, inspect, retrieve and/or measure information based on one or more network connections themselves including local network connections and the WAN. For example, information can be retrieved from a network connection between a physical or virtual computer system and the WAN such as a connection between a client computer system, a server computer system or a cloud infrastructure and the WAN. Such a connection may be realized between, for example, an edge router of the WAN and a gateway router or interface of the computer system. Additionally or alternatively, information can be retrieved from a network connection between a computer system and a local gateway router, or between interfaces or edge routers of the WAN itself or otherwise between network or computing elements communicably connected via the WAN to constitute network information about the WAN. For example, a deep packet inspection (DPI) mechanism can be employed to obtain information such as one or more of, inter alia: data received by a scheduled database read; information about a format of data communicated via the WAN such as data formats that can be recognized, inferred or deduced from network traffic; information about one or more applications, services, facilities, functions or software routines communicating via the WAN such as data formats that can be recognized, inferred or deduced from network traffic or network protocols employed; application type information that can be inferred, recognized or deduced from the network traffic; application delay information; application jitter information; and other network traffic information as will be apparent to those skilled in the art.

In some embodiments, the parameter collectors 432 or the data collector 312 will include time information associated with collected data such that a time, period or frequency of collection can be determined.

The data collector 312 further optionally includes a data cleaner, formatter and/or transformer 434 as one or more hardware, software, firmware or combination components for affecting the format and/or content of the data collected by the parameter collectors such that the data is suitable for aggregation by an aggregator 436 for the generation of a vector suitable for classification by the classifier 206. In one embodiment, the data cleaner, formatter and/or transformer 434 is operable on the basis of rules that define how data is to be prepared. Thus the parameter collectors 432 and clean/format/transformer 434 generate potentially multiple items of data that are subsequently aggregated by the aggregator 436 to generate aggregate records of data. The aggregator 436 is a hardware, software, firmware or combination component configured to receive multiple data items and generate an aggregate record. The format of the aggregate record and/or the mechanism for aggregation can be rule-based. Each aggregate record can constitute a particular time period such that data is included for a predetermined number of minutes, hours, days, weeks and the like.

The data collector 312 further includes a vector generator 438 for generating a vector from a one or more aggregate data records generated by the aggregator 436. The vector is a representation of the aggregate data records suitable for classification by the classifier 206 in the feature space by a classification algorithm such as k-NN. In one embodiment, the vector constitutes an encoding of network communication information received by parameter collectors 432 including: network addresses; port counts; volume of data; class of service; packet loss; type of application; session count; application delay; and application jitter. It will be apparent to those skilled in the art that additional, lesser or different data can be used as a basis for generating the vector representation. Thus, the vector can be considered a single or multidimensional feature vector that is used to describe a data set collected by the data collector 312.

The vector representation generated by the vector generator 438 can be based on a vector space model defined for the network information collected by the data collector 312. For example, an n-dimensional vector can represent aggregate data elements a1, a2, . . . $a_n$, each element corresponding to a type of data collected by, for example, a parameter collector 432 and aggregated by the aggregator 436. A technique for taking communication information and converting it to feature vectors is described in "*A New Intrusion Detection System Based on KNN Classification Algorithm in Wireless Sensor Network*" (Li et al, Journal of Electrical and Computer Engineering, Article ID 240217, 2014). Furthermore, the use of a vector space model for indexing stored entities is described in "*A Vector Space Model for Automatic Indexing*" (Salton et al, Communications of the ACM, Volume 18 Issue 11, November 1975, Pages 613-620).

Figure 5:
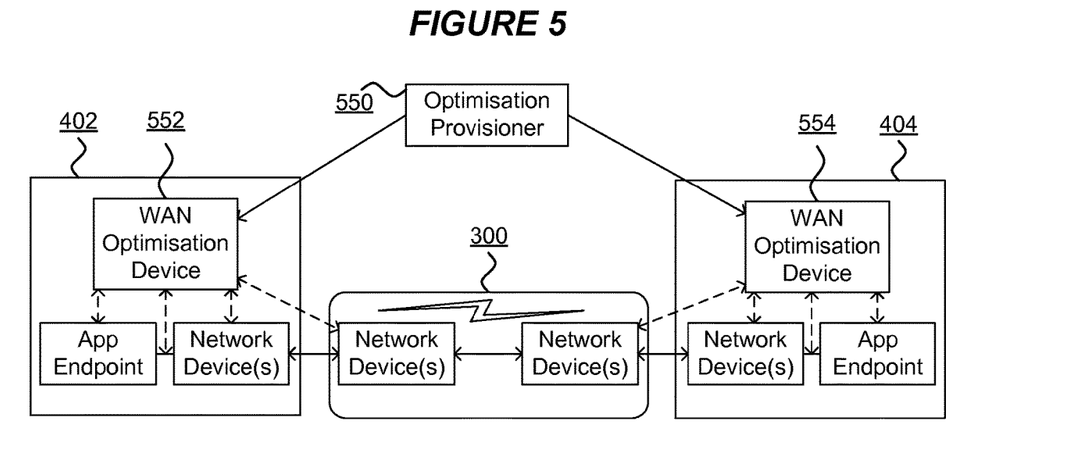
FIG. 5 illustrates an arrangement of the optimization provisioner of FIG. 3 to implement WAN optimization for the application in accordance with embodiments of the present disclosure.

FIG. 5 illustrates an arrangement of the optimization provisioner 320 of FIG. 3 to implement WAN optimization for the application 310 in accordance with embodiments of the present disclosure. In use, the classification 208 generated based on training data sets 202 is used by the classifier 206 to classify the application data set 314 for an application 310 to determine the suitability of network communication for the application 310 for WAN optimization. The suitability is determined based on the classification of the application data set 314. For example, using a k-NN algorithm, a Euclidean distance between a feature vector for the application data set 314 an k nearest feature vectors in the classification 208 (classified from training data sets 202) can be used to determine whether the application 310 and network communication for the application 310 is suitable for WAN optimization based on the WAN optimization suitability indicators 204 associated with the k nearest neighbor feature vectors. In one embodiment, a predetermined number, k, of nearest neighbor vectors in the feature space are identified for an application data set 314. One approach to identifying an appropriate classification for the application data set 314 is to provide a vote to each of the k nearest neighbors—where k is odd—and to classify the application data set 314 on the basis of the most votes such that each of the k nearest neighbors votes in accordance with its own classification.

Where the classification of the application data set 314 by the classifier 206 indicates that the application 310 is suitable for WAN optimization, the optimization provisioner 320 implements WAN optimization for the application 310. Such optimization can be implemented by deploying WAN optimization devices 552, 554 at endpoints of network communication such as in communication with application endpoints 442, 444 and/or network devices associated with computer systems 402, 404 at endpoints. In one embodiment, the WAN optimization devices 552 are virtualized devices for providing one or more optimization measures and are therefore deployable remotely by a optimization provisioner 320 provided sufficient access to endpoint computer systems is available to the provisioner 320. Accordingly, a determination as to the suitability of optimization can be determined and the deployment of WAN optimization measures can be implemented automatically without involvement of a user or operator and without a need to speculatively implement WAN optimization on a trial and error basis.

In one embodiment, each of the training data sets 202 is a vector such as a multi-dimensional vector derived from data relating to a software application communicating via a WAN where the data is collected over a predetermined time period. The time period can be a period in relation to the execution of an the application—such as: a period at a commencement of operation of the application; a period during which network communication occurs for the application at a rate, volume, frequency or periodicity that meets or exceeds a predetermined threshold; a period some predetermined time after a commencement of the application or before a cessation of the application; a period commencing or synchronized with respect to a point in time when one or more predetermined conditions are satisfied; a period at a point during the execution and/or communication of the application having a predetermined duration or range of durations; one or more periods as described in the preceding examples; or any other period of time as will be suitable for collecting data for the definition of a vector for a training set as will be apparent to those skilled in the art. Where training sets 202 are generated from data occurring over a predetermined time period then the application data set 314 for classification to determine the suitability of WAN optimization for an application 310 will also be based on data in accordance with the predetermined time period.

Figure 6:
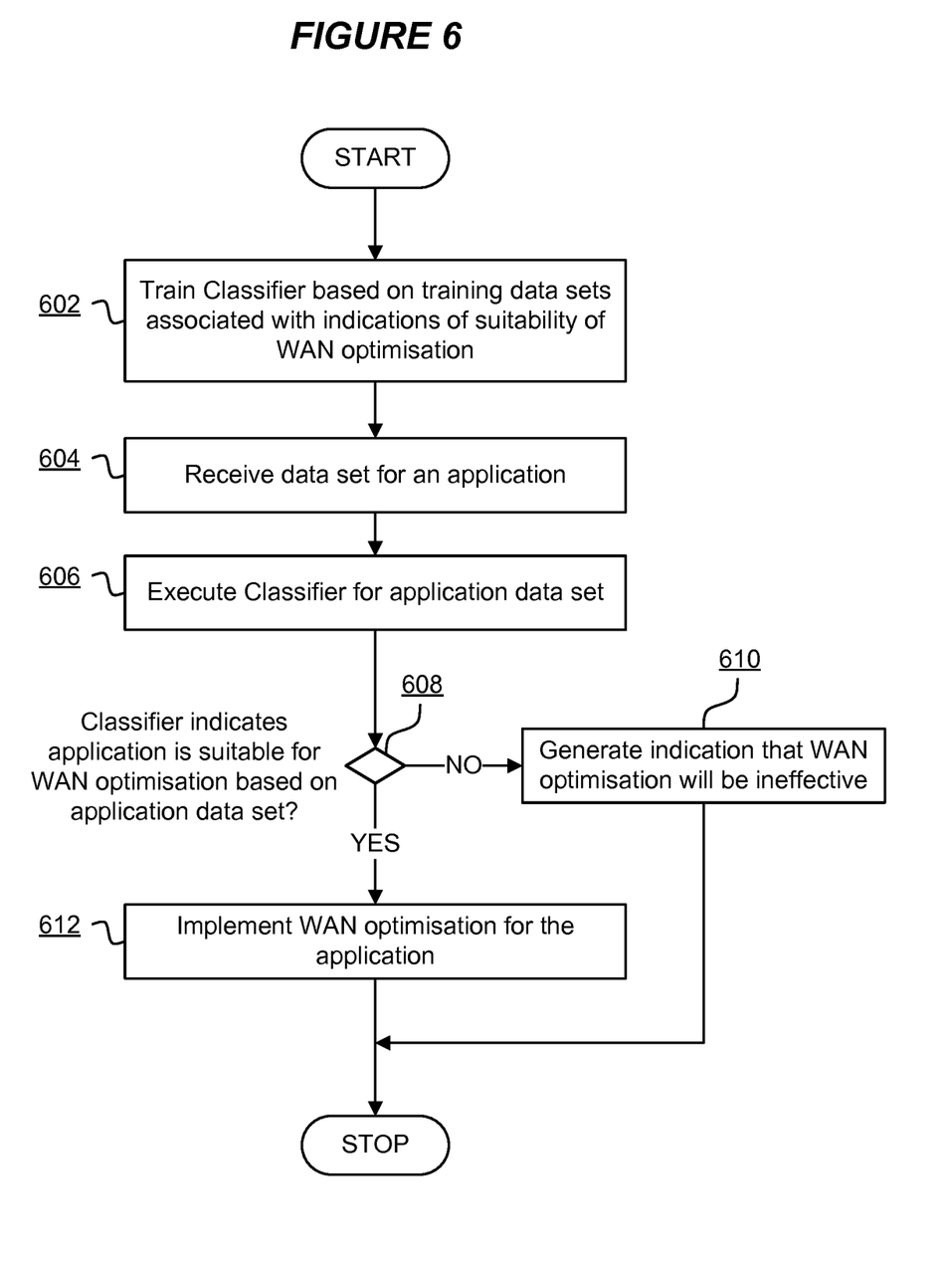
FIG. 6 is a flowchart of a method of improving performance of network communication for an application communicating via a WAN in accordance with embodiments of the present disclosure.

FIG. 6 is a flowchart of a method of improving performance of network communication for an application 310 communicating via a WAN 300 in accordance with embodiments of the present disclosure. Initially, at 602, the classifier 206 is trained based on a plurality of training data sets 202 each having associated an indication of suitability for WAN optimization 204 to generate the classification 208. At 604 the method receives an application data set 314 and at 606 the classifier 205 is executed to classify the application data set according to the classification 208. At 608 a determination is made as to whether the network communication for the application 310 is a candidate for WAN optimization based on the classification of the application data set 314 and comparisons with existing classifications in the classification 208. Responsive to an identification that the network communication for the application 310 is a candidate for WAN optimization the optimization provisioner 320 implements WAN optimization for the application 310 at 612. Notably, where the classification 208 is also suitable to identify one or more types, measures or mechanisms for WAN optimization for the application 310, the optimization provisioner 320 can be configured to implement one or more of the identified measures or mechanisms or to configure WAN optimization according to the identification. Alternatively, where the classifier indicates that the application 310 is not suitable for WAN optimization the method generates an indication that WAN optimization will be ineffective at 610.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present disclosure has been described in relation to the above described example embodiments, the disclosure is not limited thereto and that there are many possible variations and modifications which fall within the scope of the claims.

The scope of the present disclosure includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A method of improving performance of network communication for an application communicating via a wide area network (WAN) comprising:
   executing a classifier including a machine learning algorithm to classify a data set corresponding to a profile of network communication via the WAN for the application, the classification identifying the network communication as a candidate for WAN optimization, wherein the classifier is trained based on a plurality of training data sets, each training data set is a vector in a feature space and has associated an indication of suitability of the training data set for WAN optimization determined empirically based on an implementation of a WAN optimization mechanism and an observation of an effect on a performance of network communication via the WAN; and
   responsive to the identification of the network communication as a candidate for WAN optimization, implementing the WAN optimization for the application.

2. The method of claim 1, wherein each training data set corresponds to a training profile of network communication via the WAN.

3. The method of claim 2, wherein each training profile is generated from previous network communication via the WAN for the application.

4. The method of claim 1, wherein WAN optimization includes one or more of: traffic shaping; data deduplication; compression; caching; non-essential traffic identification and reduction; usage rule enforcement; or protocol spoofing.

5. The method of claim 1, wherein the machine learning algorithm uses a k-nearest neighbors (k-NN) algorithm.

6. The method of claim 1, wherein the data set is an aggregation of data received from a plurality of parameter collectors.

7. The method of claim 6, wherein the parameter collectors include one or more of: a traffic analyzer; or a deep packet inspector.

8. The method of claim 6, wherein the data set is aggregated from data received in a predetermined time window.

9. The method of claim 1, wherein implementing the WAN optimization includes deploying a WAN optimization device in association with a single endpoint and separate WAN optimization devices for each endpoint of communication across the WAN.

10. The method of claim 9, wherein the application is a cloud application including a client and a cloud server, and the network communication via the WAN takes place between the client and the cloud server, and wherein each of the WAN optimization devices is a virtualized device.

11. The method of claim 9, wherein each WAN optimization device implements WAN optimization by implementing one or more network communication optimization techniques coordinated between the WAN optimization devices, wherein the network communication optimization techniques include: traffic shaping; data deduplication; compression;
   caching; non-essential traffic identification and reduction; usage rule enforcement; and protocol spoofing.

12. A computer system comprising:
   a processor and memory for improving performance of network communication for an application communicating via a wide area network (WAN) by:
      executing a classifier including a machine learning algorithm to classify a data set corresponding to a profile of network communication via the WAN for the application, the classification identifying the network communication as a candidate for WAN optimization, wherein the classifier is trained based on a plurality of training data sets, each training data set is a vector in a feature space and has associated an indication of suitability of the training data set for WAN optimization determined empirically based on an implementation of a WAN optimization mechanism and an observation of an effect on a performance of network communication via the WAN; and
      responsive to the identification of the network communication as a candidate for WAN optimization, implementing the WAN optimization for the application.

13. A non-transitory computer-readable storage medium storing a computer program element comprising computer program code to, when loaded into a computer system and executed thereon, cause the computer system to perform the method as claimed in claim 1.

* * * * *